United States Patent
Khandelwal et al.

(10) Patent No.: US 10,637,268 B2
(45) Date of Patent: Apr. 28, 2020

(54) SYSTEM AND METHOD FOR FAST CHARGING OF BATTERIES BASED ON DYNAMIC CUTOFF VOLTAGE

(71) Applicant: Samsung Electronics Co., Ltd., Suwon-si, Gyeonggi-do (KR)

(72) Inventors: Ashish Khandelwal, Bengaluru (IN); Sanoop Ramachandran, Kozhikode (IN); Krishnan Seethalakshmi Hariharan, Bengaluru (IN); Hanseok Park, Seoul (KR); Kiyoung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/154,325

(22) Filed: May 13, 2016

(65) Prior Publication Data

US 2016/0336763 A1    Nov. 17, 2016

(30) Foreign Application Priority Data

May 15, 2015 (IN) .......................... 2470/CHE/2015
Sep. 3, 2015 (IN) .......................... 4675/CHE/2015

(51) Int. Cl.
*H02J 7/00* (2006.01)
*H02J 7/34* (2006.01)

(52) U.S. Cl.
CPC .............. *H02J 7/007* (2013.01); *H02J 7/342* (2020.01)

(58) Field of Classification Search
CPC ...... H02J 7/0003; H02J 7/0004; H02J 7/0008; H02J 2007/0049; H02J 2007/005;
(Continued)

(56) References Cited

U.S. PATENT DOCUMENTS 5,367,244 A * 11/1994 Rose .................. H02J 7/008
                                                320/141
6,075,342 A    6/2000 Koenck
(Continued)

FOREIGN PATENT DOCUMENTS

| EP | 0510015 A1 | 10/1992 |
| WO | 9108604 A1 | 6/1991 |
| WO | 2014/008278 A1 | 1/2014 |

OTHER PUBLICATIONS

Indian Office Action dated Oct. 29, 2018, issued in Indian Patent Application No. 4675/CHE/2015.
(Continued)

*Primary Examiner* — Richard Isla
*Assistant Examiner* — Michael N Dibenedetto
(74) *Attorney, Agent, or Firm* — Jefferson IP Law, LLP

(57) ABSTRACT

A system and a method for fast charging a battery, based on dynamically determined cut-off voltage are provided. The system includes a hardware processor, and a non-volatile memory comprising instructions, the instructions executed by the hardware processor configure the hardware processor to identify dynamically, a current state of charge (SOC) of the battery, by a battery charging module, determine at least one fast charging profile that matches the current SOC of the battery, by the battery charging module, determine a dynamic cut-off voltage that matches the fast charging profile, by the battery charging module, and charge the battery based on the dynamic cut-off voltage, by the battery charging module.

12 Claims, 14 Drawing Sheets

(58) Field of Classification Search
CPC ........ H02J 7/0011; H02J 7/0022; H02J 7/007; H02J 7/0077; H02J 7/008; H02J 7/0081; H02J 7/005; H02J 7/0086
See application file for complete search history.

(56) References Cited

U.S. PATENT DOCUMENTS

| | | | |
|---|---|---|---|
| 9,293,940 B2* | 3/2016 | Lim | H02J 7/0083 |
| 9,401,616 B2* | 7/2016 | Yun | H02J 7/0068 |
| 2002/0101218 A1 | 8/2002 | Koenck et al. | |
| 2010/0188238 A1 | 7/2010 | Yasuda et al. | |
| 2011/0156661 A1* | 6/2011 | Mehta | H02J 7/0073 320/160 |
| 2014/0002031 A1 | 1/2014 | Chaturvedi et al. | |
| 2015/0077058 A1* | 3/2015 | Jung | H01M 10/44 320/112 |
| 2016/0020618 A1* | 1/2016 | Yang | H02J 7/022 320/162 |
| 2016/0105052 A1* | 4/2016 | Lee, II | H02J 7/0054 320/101 |
| 2017/0133869 A9* | 5/2017 | Reisz | H02J 7/0031 |

OTHER PUBLICATIONS

Indian Office Action dated Jan. 7, 2019, issued in Indian Patent Application No. 2470/CHE/2015.

* cited by examiner

SYSTEM AND METHOD FOR FAST CHARGING OF BATTERIES BASED ON DYNAMIC CUTOFF VOLTAGE

CROSS-REFERENCE TO RELATED APPLICATION(S)

This application claims the benefit under 35 U.S.C. § 119(a) of an Indian Provisional patent application filed on May 15, 2015 in the Indian Patent Office and assigned Serial number 2470/CHE/2015, of an Indian Non-Provisional patent application filed on Sep. 3, 2015 in the Indian Patent Office and assigned Serial number 4675/CHE/2015, and of an Indian Non-Provisional patent application filed on Oct. 8, 2015 in the Indian Patent Office and assigned Serial number 2470/CHE/2015, the entire disclosure of each of which is hereby incorporated by reference.

TECHNICAL FIELD

The present disclosure relates to battery management. More particularly, the present disclosure relates to fast charging of batteries.

BACKGROUND

Batteries are essential components of portable devices, as they supply power required for functioning of the portable devices. With the progress in technology, the portable devices such as mobile phones, portable gaming machines and the like became sophisticated with advanced software and hardware support. When users benefited from such new features, accordingly the battery charge requirements increased. Traditional primary batteries (i.e., non rechargeable batteries) which come with a limited capacity were found inadequate to serve such requirements. Even if the primary cells were used, higher power consumption required frequent battery changes, which also increases the cost. Rechargeable batteries were introduced as a solution for this problem. The rechargeable batteries are convenient as they may be recharged as required and when required. Most of the portable devices of the present age use rechargeable batteries as the power source.

However, one disadvantage of the rechargeable batteries, from a user and convenience perspective is the prolonged charging time. The batteries may take a few hours to get fully recharged, and the charging time depends on the battery capacity. High capacity batteries that are designed to support high intensity usage take considerably long time to get fully charged. As a solution to this problem, fast charging adapters have been introduced. A fast charging adapter reduces the charging time considerably. However, one disadvantage of the existing fast charging systems is that their output is the same regardless the type and capacity of the battery that needs to be charged. As the charging requirements vary based on type specification of batteries, using the same fast charger for different types of batteries may adversely affect the battery health and life cycle.

Further, in the existing battery charging systems, batteries are charged by applying current till the cut-off voltage is reached. Though the batteries may be charged by applying varying voltage, disadvantage of this schema is that the current levels in the battery spikes to higher levels, which in turn adversely affect life of the battery.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to dynamically determine cut-off voltage to charge a battery, based on state of charge (SOC) of battery.

Another aspect of the present disclosure is to charge the battery, based on the dynamically determined cut-off voltage.

Another aspect of the present disclosure is to determine different stages of voltage to be applied for the battery to reach the dynamically determined cut-off voltage.

According to an aspect of the invention, a system for fast charging of a battery is provided. The system includes a hardware processor, and a non-volatile memory comprising instructions, the instructions executed by the hardware processor configure the hardware processor to identify dynamically, a current state of charge (SOC) of the battery, by a battery charging module, determine at least one fast charging profile that matches the current SOC of the battery, by the battery charging module, determine a dynamic cut-off voltage that matches the fast charging profile, by the battery charging module, and charge the battery based on the dynamic cut-off voltage, by the battery charging module.

According to an aspect of the invention, a method for fast charging of a battery is provided. The method includes identifying dynamically, a current state of charge (SOC) of the battery, determining at least one fast charging profile that matches the current SOC of the battery, determining a dynamic cut-off voltage that matches the determined at least one fast charging profile, and charging the battery based on the dynamic cut-off voltage.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
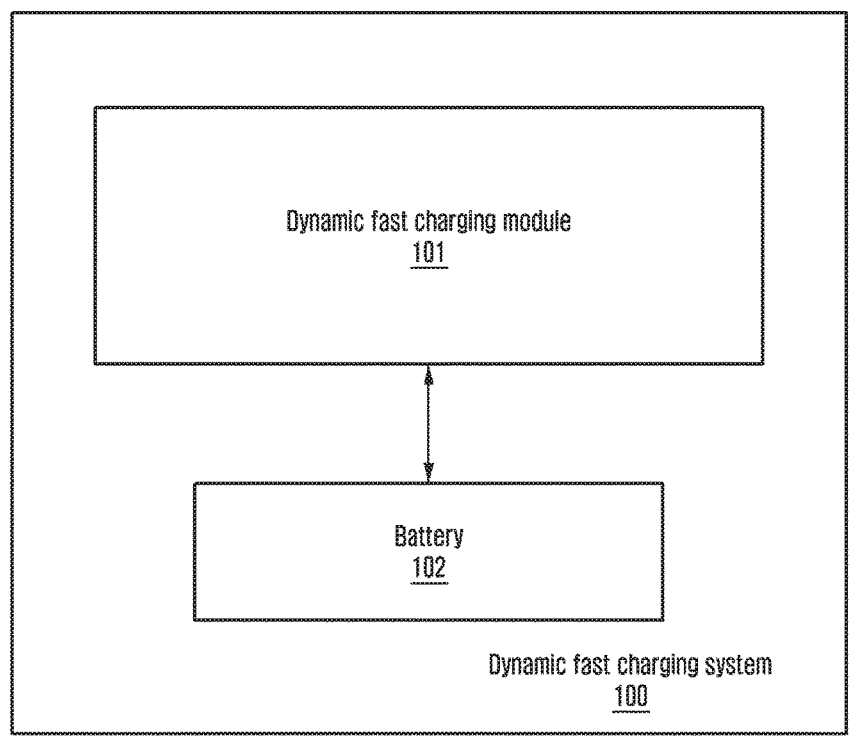
FIG. 1 illustrates a block diagram of a dynamic fast charging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments herein disclose a dynamic fast charging mechanism. Referring now to the drawings, and more particularly to FIGS. 1 through 6C, where similar reference characters denote corresponding features consistently throughout the figures, there are shown various embodiments.

FIG. 1 illustrates a block diagram of a dynamic fast charging system according to an embodiment of the present disclosure.

Referring to FIG. 1, the dynamic fast charging system comprises of a dynamic fast charging module 101 that may be connected to a battery 102 that needs to be charged.

The dynamic fast charging module 101 may be configured to collect at least one parameter specific to the battery 102 connected, as input data. The dynamic fast charging module 101 may be further configured to determine a current state of charge (SOC) of the battery 102, by processing the inputs collected. The dynamic fast charging module 101 may be further configured to select at least one fast charging profile that matches the current SOC of the battery 102. The dynamic fast charging module 101 may be further configured to determine dynamically, a cut-off voltage value that matches the selected fast charging profile. The dynamic fast charging module 101 may be further configured to charge the battery 102, based on the determined cut-off voltage value. In an embodiment, the dynamic fast charging module 101 charges the battery by applying voltage, wherein an amount of the voltage applied to charge the battery is determined based on the dynamically determined current SOC of the battery.

The battery 102 may be any rechargeable battery which has specifications that match at least one fast charging profile being supported by the dynamic fast charging module 101.

Figure 2:
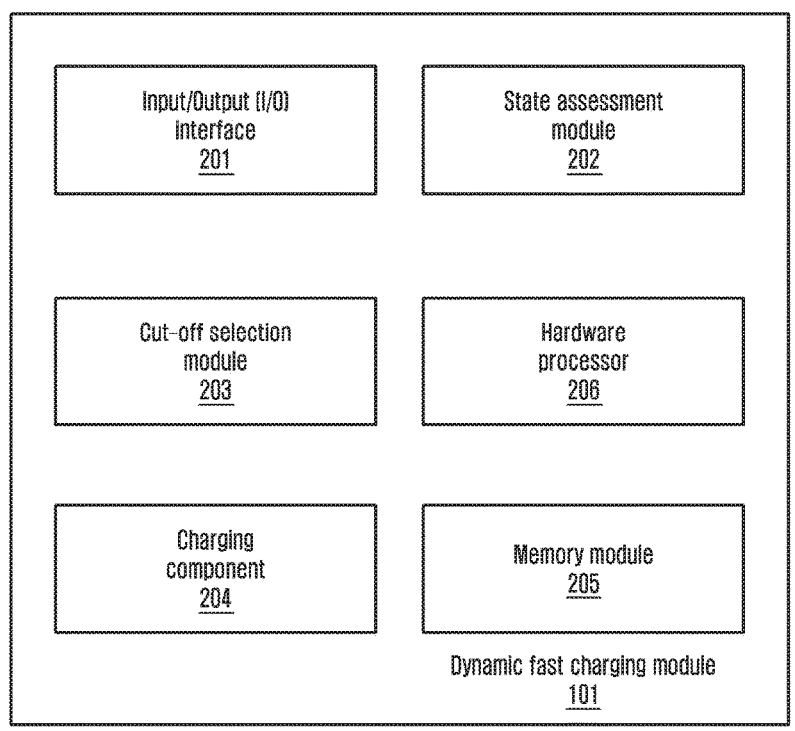
FIG. 2 illustrates a block diagram that shows components of a dynamic fast charging module according to an embodiment of the present disclosure.

FIG. 2 illustrates a block diagram that shows components of a dynamic fast charging module according to an embodiment of the present disclosure.

Referring to FIG. 2, the dynamic fast charging module 101 comprises of an input/output (I/O) interface 201, a state assessment module 202, a cut-off selection module 203, and a charging component 204.

The I/O interface 201 may be configured to provide at least one suitable medium to connect at least one battery 102 to the dynamic fast charging module 101. The medium provided by the I/O interface 201 may be configured to support collection of certain data as input for the dynamic fast charging module 101 to determine SOC of the battery 102, and charging of the battery 102.

The state assessment module 202 may be configured to determine the current SOC of the battery 102, based on at least one input collected from the battery 102. For example, the input may be voltage and temperature values. The state assessment module 202 may be configured to determine the current SOC of the battery 102, based on at least one reference data stored in the memory module 205. The state assessment module 202 may be further configured to communicate the determined current SOC information at least to the cut-off selection module 203. The state assessment module 202 may be further configured to measure and consider an over-potential value, higher value of which indicates degradation of the battery 102, while determining the current SOC of the battery 102.

The cut-off selection module 203 may be configured to collect information pertaining to the determined current SOC of the battery 102, from the state assessment module 202. The cut-off selection module 203 may be further configured to identify at least one fast charging profile that matches the identified current SOC. The cut-off selection module 203 may be further configured to determine a cut-off voltage value that matches the identified fast charging profile. In an embodiment, the cut-off selection module 203 identifies the matching fast charging profile, and the cut-off voltage, based on corresponding reference data stored in the memory module 205. The cut-off selection module 203 may be further configured to communicate the cut-off voltage value to the charging component 204.

The charging component 204 may be configured to select the cut-off voltage value, as instructed by the cut-off selection module 203. The charging component 204 may be configured to vary the cut-off voltage as per the data received from the cut-off selection module 203, which in turn helps to adjust the voltage as per requirements and SOC of different batteries 102. The charging component 204 may be further configured to charge the battery 102 by applying suitable voltage, preferably at different stages. In a preferred embodiment, the charging module 204 determines the amount of voltage to be applied at each stage, based on the determined SOC of the battery 102.

The memory module 205 may be configured to store all information related to, and required to execute the dynamic fast charging process. For example, the memory module 205 may store reference data pertaining to SOC, fast charging profile, cut-off voltage value, information pertaining to amount of voltage (in each step/stage) to be applied to charge the battery 102, and so on. In various embodiments, the data in the memory module 205 is statically or dynamically configured.

The memory module 205 may also store instructions which are executed by a hardware processor 206, such as a central processing unit (CPU). It will be understood by those of ordinary skill in the art that the instructions when executed by the processor 206 perform the functionality described herein. For example, the hardware processor 206 may perform the functionality of the state assessment module 202, the cut-off selection module 203, the charging component 204 and other like modules.

Figure 3:
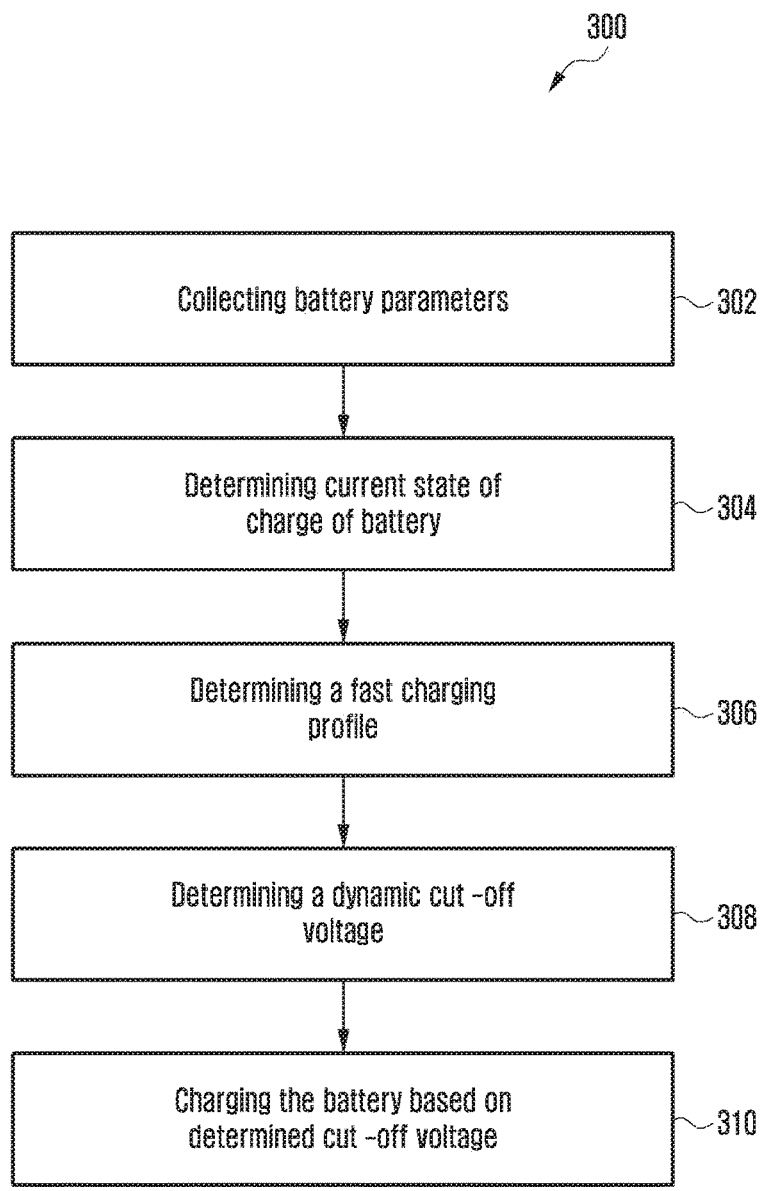
FIG. 3 is a flow diagram that depicts a method of fast charging a battery using a dynamic fast charging system according to an embodiment of the present disclosure.

FIG. 3 is a flow diagram that depicts a method of fast charging a battery using the dynamic fast charging system according to an embodiment of the present disclosure.

Referring to FIG. 3, at least one battery parameter is collected at operation 302 as input by the dynamic fast charging module 101. The battery parameter collected as input may be at least one of the parameters such as but not limited to a voltage value, and temperature value pertaining to the battery 102.

Further, the current SOC of the battery is determined at operation 304 by the state assessment module 202 of the dynamic fast charging module 101, by processing the collected input(s), wherein the term "current SOC refers to the SOC of the battery at the time instance the SOC has been determined by the state assessment module 202". In an embodiment, processing the collected inputs to determine the SOC involves comparing the input values with at least one reference data stored in the memory module 205 of the dynamic fast charging module 101. The reference data with respect to the current SOC of the battery may be determined based on an electromechanical model, and/or at least one such suitable mechanism.

Further, a fast charging profile that matches the determined current SOC of the battery is determined at operation 306 by the cut-off voltage selection module 203 of the dynamic fast charging module 101. The fast charging profile may have at least one value of a cut-off voltage value (i.e. the dynamic cut-off voltage) that matches the determined current SOC of the battery 102. In an embodiment, determining the fast charging profile involves comparing the input values with at least one reference data stored in the memory module 205 of the dynamic fast charging module 101.

Further, a dynamic cut-off voltage value that matches the determined fast charging profile is determined at operation 308 by the cut-off voltage selection module 203. In an embodiment, information pertaining to the cut-off voltage value that matches the fast charging profile is mentioned in the fast charging profile itself. In another embodiment, the memory module 205 possesses a separate database that specifies cut-off voltage value that matches each fast charging profile. In this scenario, determining the cut-off voltage value involves comparing the fast charging profile information with at least one reference data stored in the memory module 205. In a preferred embodiment, the cut-off voltage value that matches a selected fast charging profile is determined by verifying effect of the cut-off voltage value on the capacity of the battery, for 'n' number of cycles, wherein value of 'n' may vary as per experimental standards.

The charging component 204 may charge the battery 102 by applying current and/or voltage. In a preferred embodiment, while charging the battery 102 by applying voltage, the charging module 204 applies voltage in various stages, wherein amount of voltage applied at each stage is determined based on SOC of the battery 102. For example, based on the current SOC of the battery to be charged, the threshold value of voltage is determined. Further, value of the voltage is selected at a minimum possible level (i.e. a first minimum voltage) such that the current doesn't exceed a limit that would affect the health of the battery adversely.

In the next stage, the value of applied voltage is increased by a pre-defined value from the first minimum voltage value, to a higher value of the voltage, such that, when applied, the resulting current does not exceed the maximum possible current, post which the health of the battery would be adversely affected. This process is repeated until the battery is charged till the determined threshold value of voltage, without the resulting current value exceeding the maximum possible current value. If at any point the charging component 204 finds out that the resulting current of a voltage being applied at that instance of time exceeds the maximum possible current value, then the voltage is reduced to a level (preferably the previous highest voltage value) such that the resulting current is not exceeding the maximum possible current value. In an embodiment, at any stage, the voltage is increased by a particular value, by keeping the first minimum voltage as a reference.

Further, based on the determined cut-off voltage value, the battery is charged at operation 310 by the charging component. The various actions in method 300 may be performed in the order presented, in a different order or simultaneously. Further, in some embodiments, some actions listed in FIG. 3 may be omitted.

Figure 4:
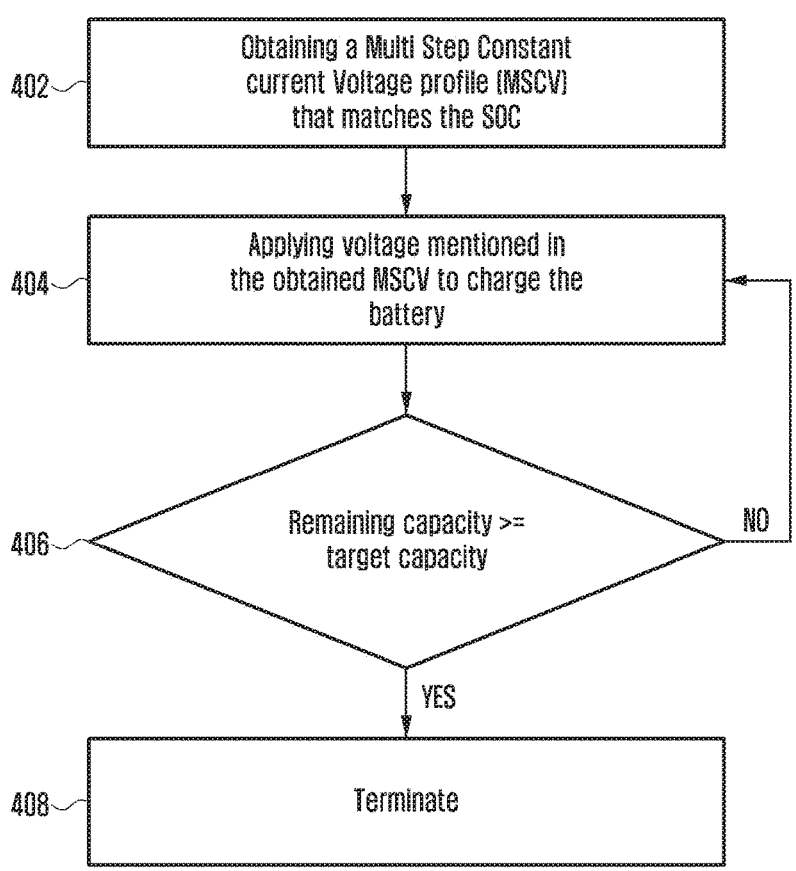
FIG. 4 is a flow diagram that depicts a method of determining voltage step values, using a dynamic fast charging system according to an embodiment of the present disclosure.

FIG. 4 is a flow diagram that depicts a method of determining voltage step values, using the dynamic fast charging system according to an embodiment of the present disclosure.

Referring to FIG. 4, once the dynamic cut-off voltage has been determined, the charging component 204 obtains at operation 402 a multi step constant current voltage profile (MSCV) that matches the current SOC of the battery 102. In an embodiment, the MSCV profile specifies the voltage to be applied to charge the battery 102.

Further, the charging component 204 applies at operation 404 the voltage as specified in the MSCV to the battery 102. After applying the voltage, the charging component 204 checks at operation 406 if the remaining capacity is greater than or equal to the dynamic cut-off voltage value. If the remaining capacity is greater than or equal to the dynamic cut-off voltage value, then the charging component 204 terminates at operation 408 the charging process. If the remaining capacity is less than the dynamic cut-off voltage value, then the charging component 204 increases the voltage by one step (as pre-configured, based on the current SOC), and applies the new voltage to charge the battery 102. This process is repeated till the battery charge reaches the dynamic cut-off voltage value.

The various actions in method 400 may be performed in the order presented, in a different order or simultaneously. Further, in some embodiments, some actions listed in FIG. 4 may be omitted.

Experimental details to illustrate efficiency of the fast charging mechanism is given below.

FIGS. 5A to 5G illustrate graphical representation of various values associated with the MSCV based fast charging of the battery according to various embodiments of the present disclosure.

Figure 6A:
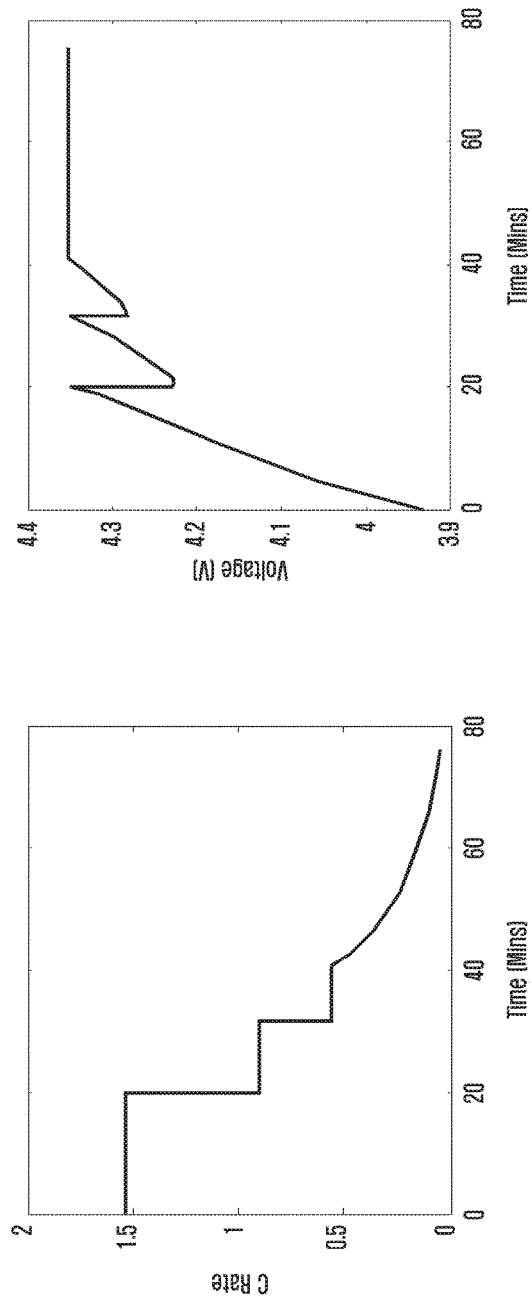
FIGS. 6A to 6C illustrate graphical representation of various values associated with a variable cut-off voltage (VCV) based fast charging a battery according to various embodiments of the present disclosure.
Figure 6B:
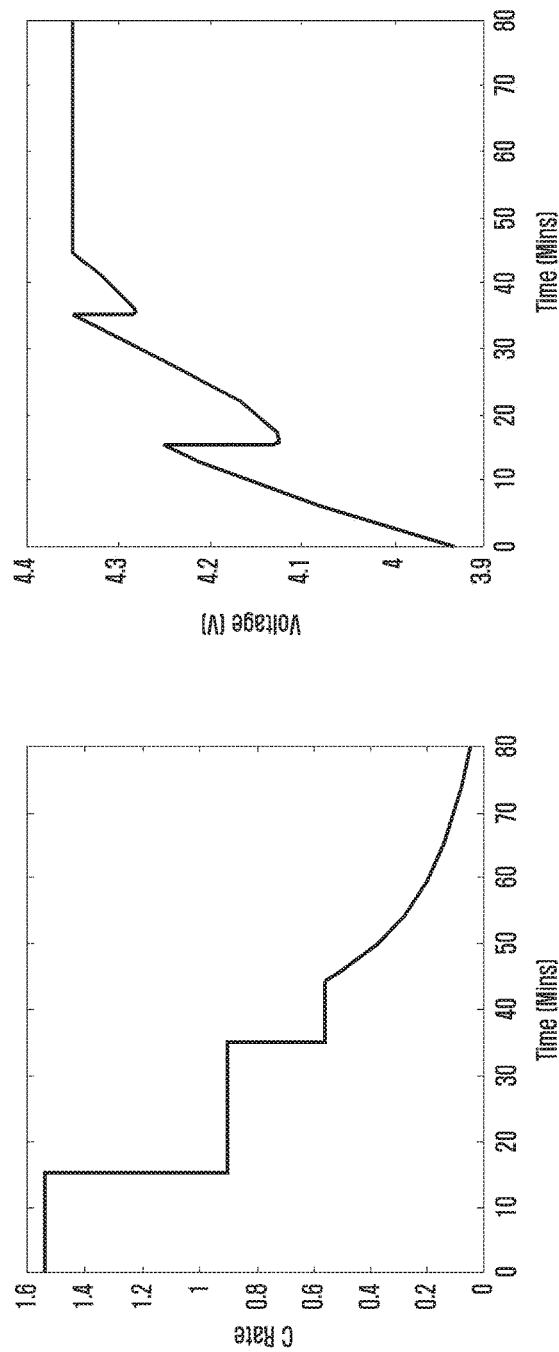
Figure 6C:
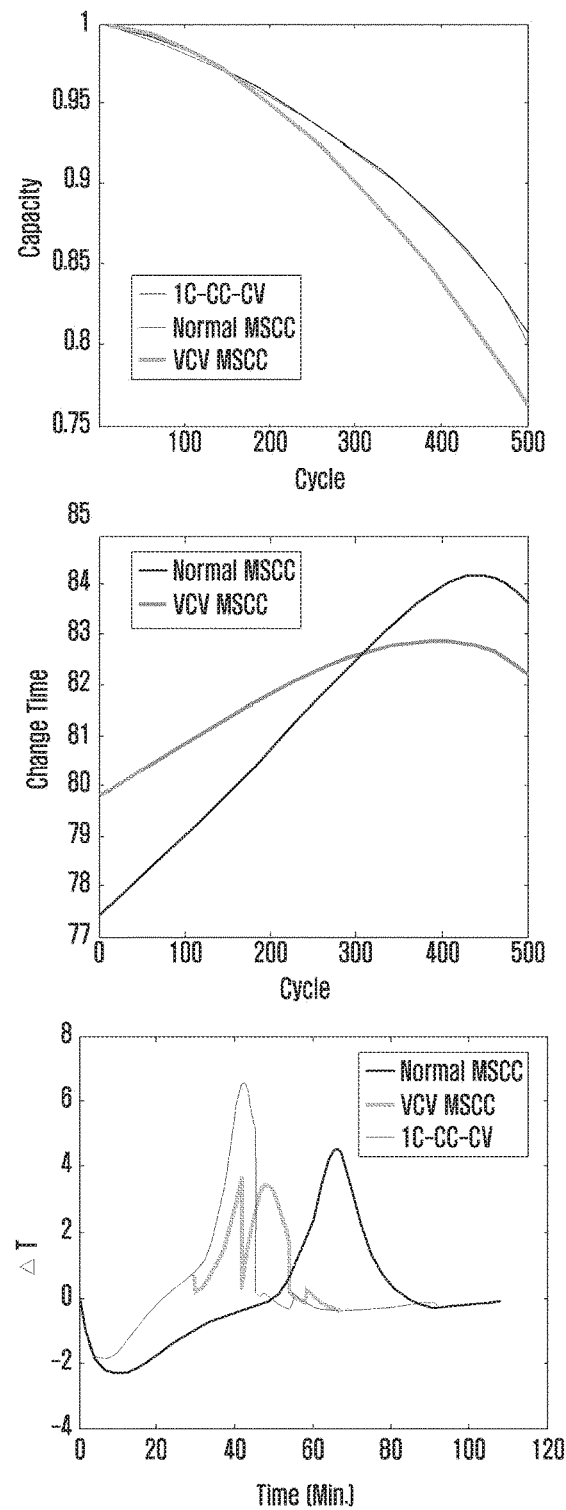

FIGS. 6A to 6C illustrate graphical representation of various values associated with the variable cut-off voltage (VCV) based fast charging of the battery according to various embodiments of the present disclosure.

Figure 5A:
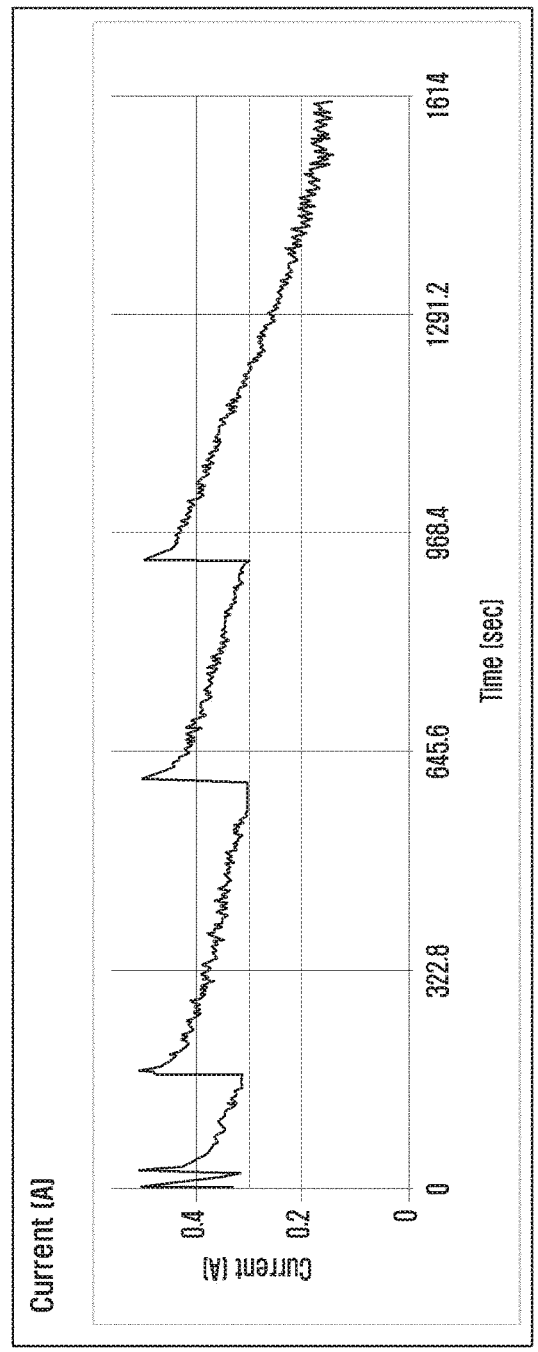
FIGS. 5A to 5G illustrate graphical representation of various values associated with a multi step of increasing constant voltage (MSCV) based fast charging of a battery according to various embodiments of the present disclosure.

The experiment has been conducted by charging a battery of capacity 300 mAh (For example, a Galaxy Gear Battery). Initially, validation of the method is performed by charging the battery with multiple step of increasing constant voltage (MSCV) as depicted in FIG. 5A (Plotting current vs. time).

Voltage is stepped from 3.6V to 4.2V in step of 0.1 V and the current is let to reduce to less than 0.12 A (0.4C) for each step. FIG. 5a indicates that the total charging of battery is done in approximately 3200 second which is much less than 2.5 hours by existing 0.7 C CC-CV charging protocol, which in turn indicates successful fast charging of the battery.

Figure 5B:
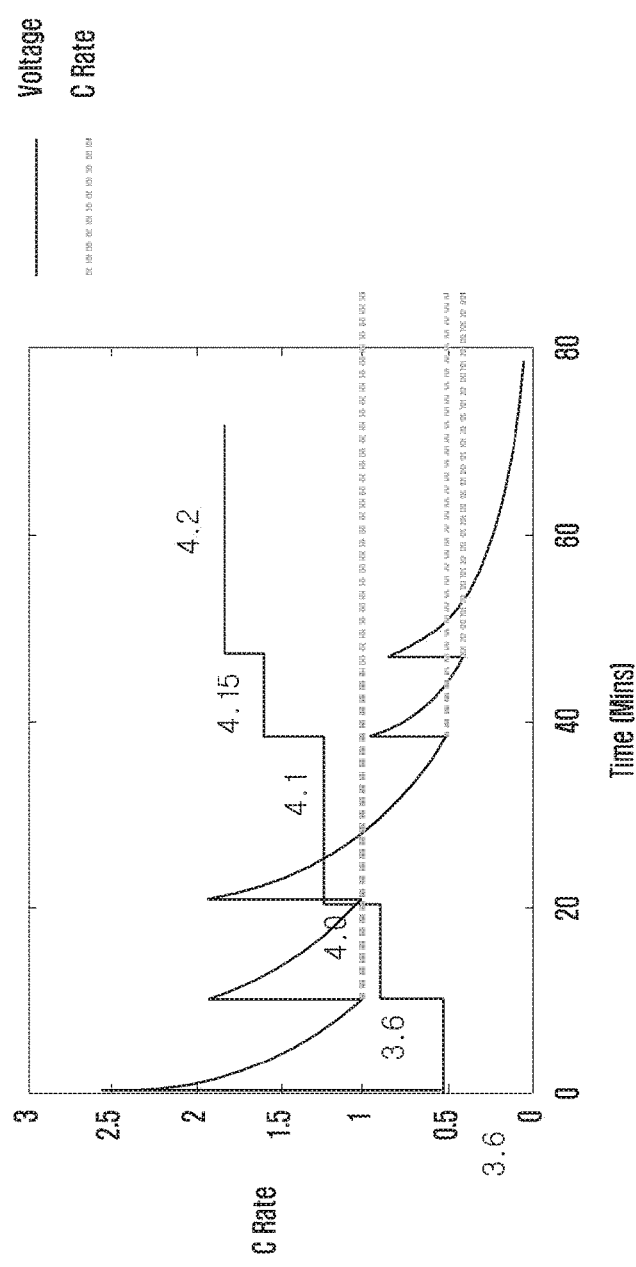
Figure 5C:
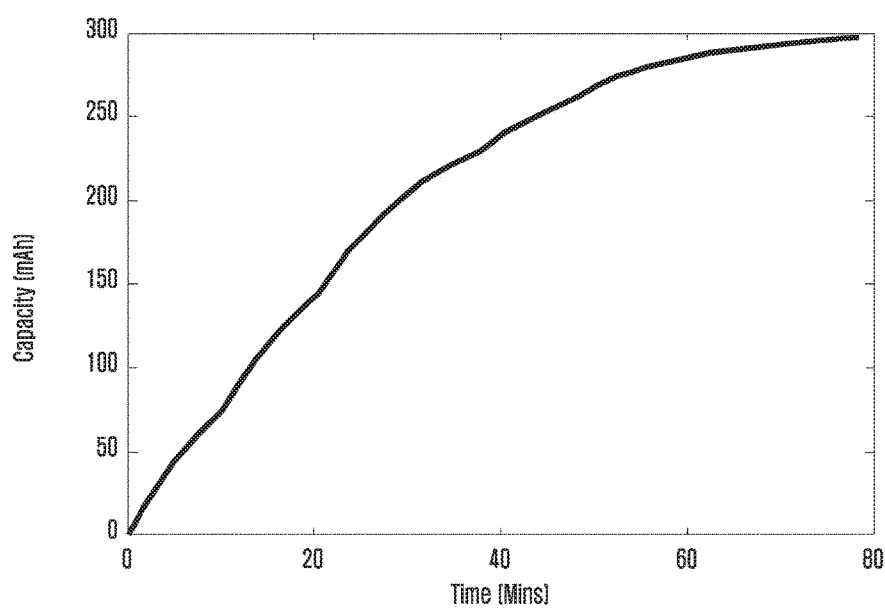
Figure 5D:
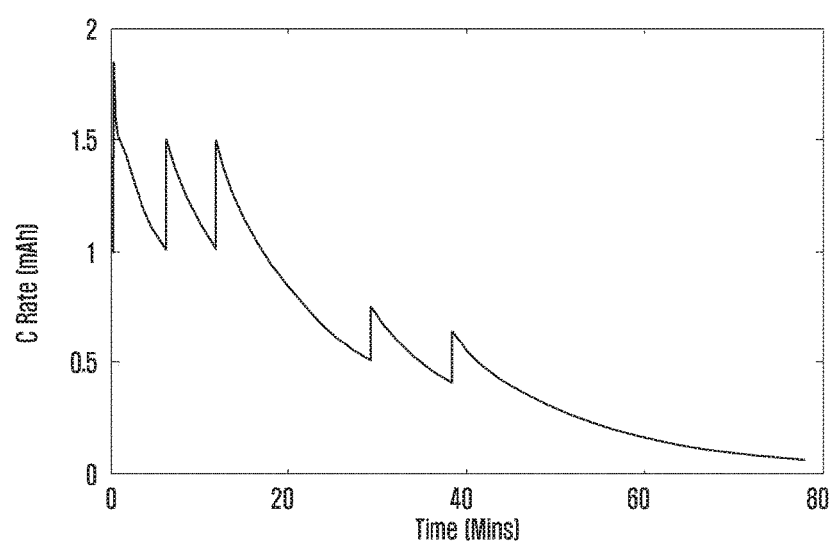
Figure 5E:
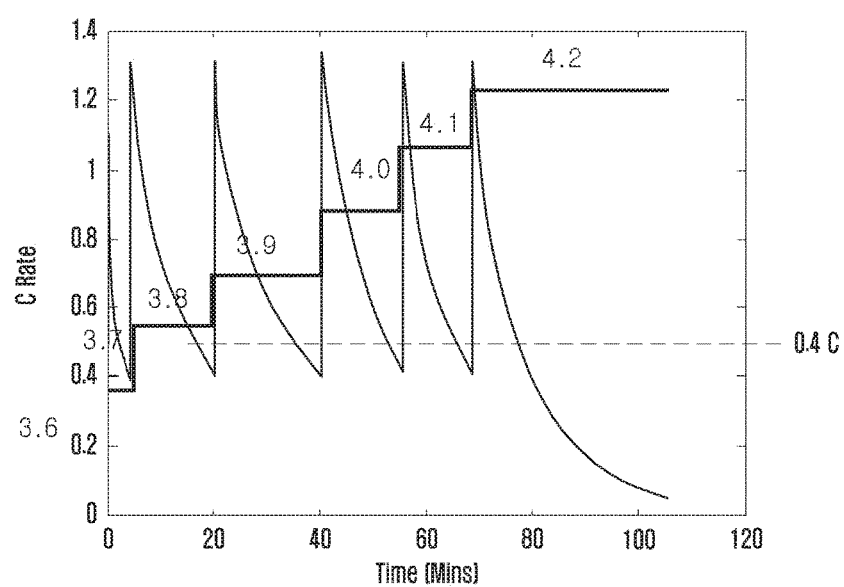
Figure 5F:
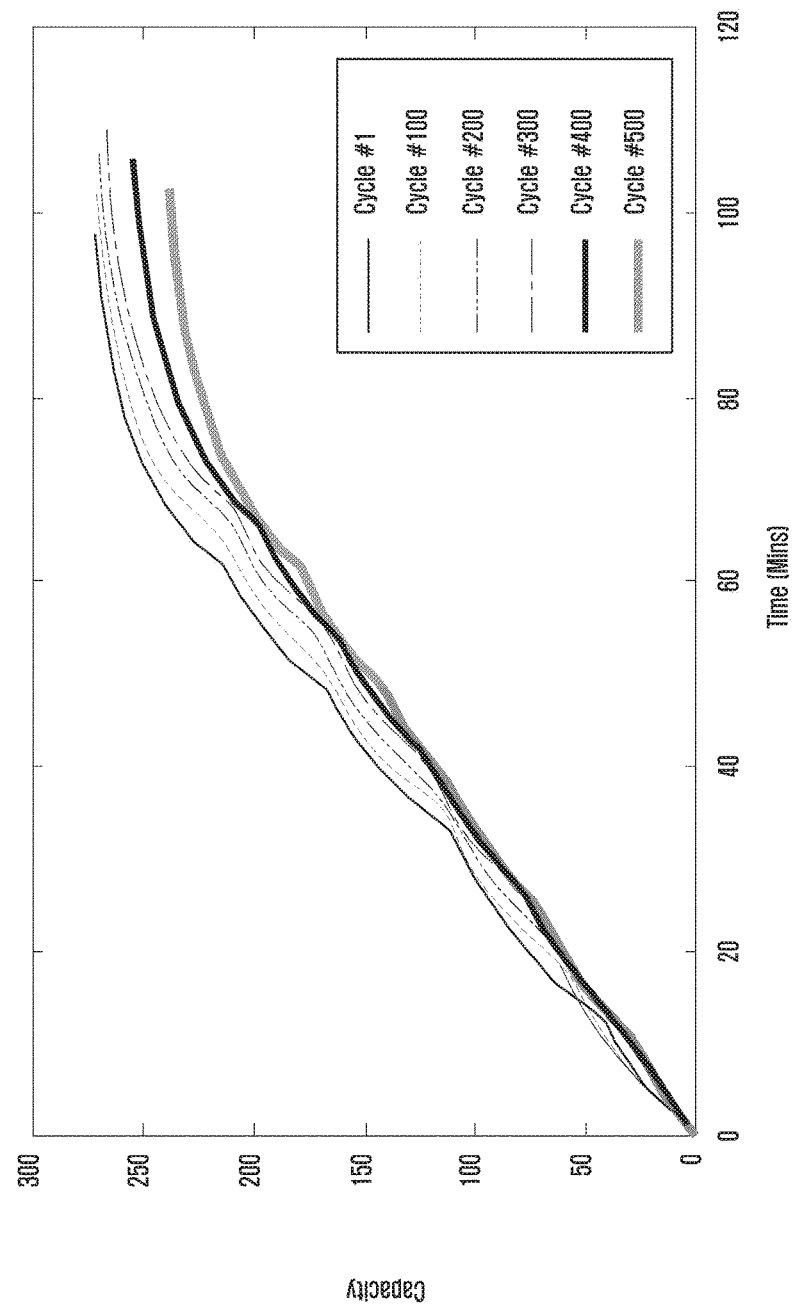

In the fast charging of the 300 mAh battery, voltage is stepped from initial voltage is 3.26 V to 3.9 V in step of 0.1 V to 4.1 V and the current is let to reduce to (0.75C) for each step. Followed by 4.1 V, voltage is stepped to 4.2 V in step of 0.05V and let the current reduce to 0.05C as shown in FIG. 5B (Current versus time profile for the first charging). The results indicate that this profile is able to fully charge the battery in 78.6 minutes (as depicted in FIG. 5C), as compare to 150 minutes of 0.7C CC-CV charging. Furthermore the electrochemical model is used to perform cyclic simulation for 500 cycle of the suggested fast charging profile followed by 1C constant current discharge. It has been found that suggested profile satisfies an existing norm of having 80% remaining capacity after 500 cycles, the result are tabulated in Table 1. Further, the results indicate that with MSCV type of charging, the battery experienced adaptive C rate reduction with cycling and is shown in FIG. 5D.

Figure 5G:
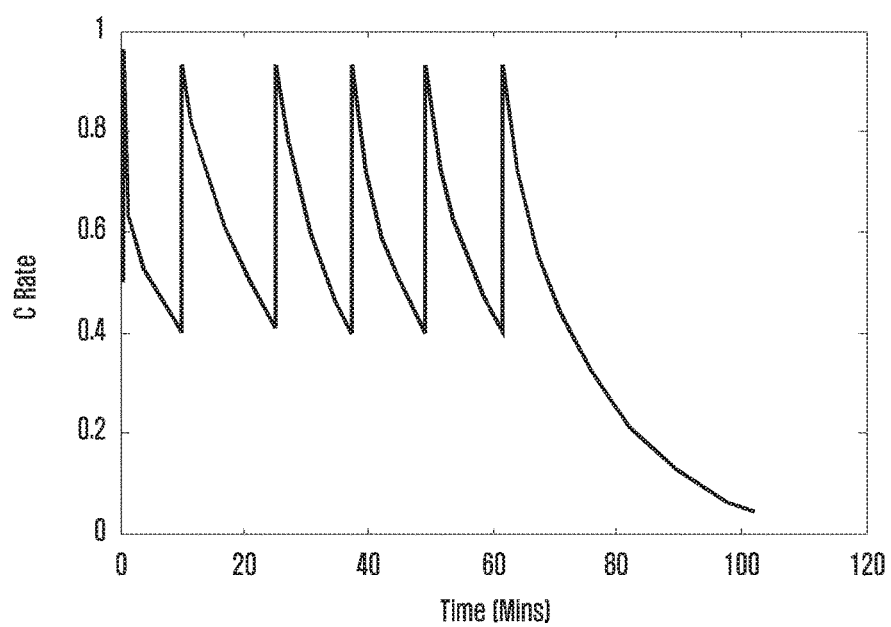

In the life extending charging protocol, voltage is stepped from initial voltage is 3.26 V to 3.9 V in step of 0.1 V to 4.1 V and the current is let to reduce to (0.4C) for each step. Followed by 4.1 V, voltage is stepped to 4.2 V in step of 0.1 V and let the current reduce to 0.05C as shown FIG. 5E. The results indicate that this profile is able to fully charge the battery in 97.9 minutes (shown by capacity vs time plot in FIG. 5F), as compare to 150 minutes of 0.7C CC-CV charging. Upon cyclic simulation of life extending protocol 87.6% remaining capacity is observed after 500 cycles. This profile also shows reduced current magnitude (as depicted in FIG. 5G) upon cycling which helps in life extension.

Value of cutoff voltage in the current profiles may be gradually increased so as to satisfy the life and or thermal standards. This is done to optimize the extent of detrimental effect of high charging current rate by reducing the cutoff voltage. Details of these two profiles along with their performance are summarized in Table 1.

The experimental results indicate that MSCV profile:
reduces the charging time;
extends the life; and
reduces the current magnitude This results in fast charging of the battery. Further, cycle life of the battery increases with minimization of degradation. The MSCV profile based charging further supports charging of the battery optimally from an arbitrary state-of-charge (without necessarily resorting to a state-of-charge estimator). Further, the MSCV based charging may be implemented with minimal change in controlling hardware. The mode of operation between CC to CV is not required, as all steps are CV steps. Further, the State estimation is easy, as each step is characterized by a constant voltage, and hence capacity (hence SOC).

Variable Cutoff Voltage (VCV) Based Charging:

This section provides information pertaining to an experimental data related to current based charging profile with variable cutoff voltage. This experiment has been carried out for a CN LiPo300 mAh battery (Galaxy gear like battery). First the degradation parameter tuning for SEM is done so that battery has 80% remaining capacity after 500 cycles of 1C CC-CV charge followed by 1C discharge with minimal change in charge time. A multistage current profile for this battery is obtained. Subsequently, following the procedure illustrated in figure the variable cutoff voltage (VCV) profile is obtained. Details of the VCV profile along with their performance are summarized in Table 2.

TABLE 2

| Name | Profile | % Capacity Remaining after 500 cycle | Initial Charge time (mins) | Charge time after 500 cycle (mins) | Maximum temperature rise (° C./K) |
|---|---|---|---|---|---|
| Normal MSCC | 1.54 C-0.9 C-0.56 C-CV | 76.4 | 77.4 | 83.7 | 6.6 |
| VCV MSCC | 1.54 C (4.25 V)-0.9 C(4.35 V)-0.56 C (4.35 V)-CV | 80.8 | 79.7 | 82.8 | 3.75 |

The experimental results indicate that the VCV profile based charging reduces the charging time, extends the life, and reduces the temperature rise. This may result in the following advantages:

Fast and/or life extending and/or temperature mitigating charging profiles may be generated as:

A method may be used to obtain charging profile for any battery chemistry;

A method may be extended to take into account changes in initial SOC of battery; and A method may be easily implemented in charge control module of battery management system (BMS).

TABLE 1

| S. no | Profile | Capacity Remaining after 500 cycle (%) | Initial and final Charge time (mins) | Profile type | Initial and final charge time for 50% Capacity (mins) | Initial charge time for 80% Capacity (mins) |
|---|---|---|---|---|---|---|
| 1 | Profile 1 | 80.16 | 78.6 78.1 | FCA | 21.2 | 40.7 |
| 2 | Profile 2 | 87.62 | 97.9 102.4 | Life extending | 48.3 | 68.7 |
| 3 | 1C CC-CV | 79.96% | 79.3 76.8 | Reference profile | 29.9 30.3 | 63.5 |

This method suggests a charging profile which charges it in approximately 79.77 minutes. This gives 47% reduction in charging time as compared to the conventional charging algorithm (charge time=150 minutes)

The various embodiments disclosed herein may be implemented through at least one software program running on at least one hardware device and performing network management functions to control the network elements. The network elements shown in FIG. 1 include blocks which may be at least one of a hardware device, or a combination of hardware device and software module.

The various embodiments disclosed herein specify a mechanism for fast charging of a battery, based on dynamic cut-off voltage. The mechanism allows dynamic determination of cut-off voltage value, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for ex. very high speed integrated circuit hardware description language (VHDL), another programming language, or implemented by one or more VHDL or several software modules being executed on at least one hardware device. The hardware device may be any kind of device which may be programmed including, for example, any kind of a computer like a server or a personal computer, or the like, or any combination thereof, for ex. one processor and two field programmable gate arrays (FPGAs). The device may also include means which could be for ex. hardware means like an application-specific integrated circuit (ASIC) or a combination of hardware and software means, an ASIC and an FPGA, or at least one microprocessor and at least one memory with software modules located therein. Thus, the means are at least one hardware means or at least one hardware-com-software means. The method embodiments described herein could be implemented in pure hardware or partly in hardware and partly in software. Alternatively, the embodiment may be implemented on different hardware devices, for ex. using a plurality of central processing units (CPUs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device having a battery, the electronic device comprising:
   a memory; and
   a processor electrically connected to the memory,
   wherein the processor is configured to:
      determine an initial state of charge (SOC) of the battery, retrieve a multistep constant voltage (MSCV) profile that matches the current SOC of the battery, apply a voltage specified by the MSCV profile as an initial charging voltage,
      charge the battery based on the initial charging voltage,
      based on the initial charging voltage being less than a first designated voltage, increase stepwise a charging voltage applied to the battery from the initial charging voltage to the first designated voltage in intervals of a first increment, and
      based on the charging voltage being increased to the first designated voltage, increase stepwise the charging voltage from the first designated voltage to a second designated voltage in intervals of a second increment, and
   wherein the first increment is greater than the second increment, and wherein an amount of the current is gradually decreased by increasing stepwise the charging voltage.

2. The device as claimed in claim 1, wherein the processor is further configured to:
   based on the initial charging voltage being greater than the first designated voltage and less than the second designated voltage, increase stepwise the charging voltage from the initial charging voltage to the second designated voltage in intervals of the second increment.

3. The device as claimed in claim 1, wherein the second designated voltage is a maximum charging voltage.

4. The device as claimed in claim 1, wherein the processor is further configured to:
   obtain at least one battery parameter from the battery, and
   retrieve an SOC of the battery corresponding to the at least one battery parameter in the memory as a current SOC of the battery.

5. The device as claimed in claim 1, wherein a current resulting from the charging voltage does not exceed a maximum possible current value.

6. A method for charging of a battery, the method comprising:
   determining an initial state of charge (SOC) of the battery, retrieving a multistep constant voltage (MSCV) profile that matches the current SOC of the battery, applying a voltage specified by the MSCV profile as an initial charging voltage;
   charging the battery based on the initial charging voltage;
   based on the initial charging voltage being less than a first designated voltage, increasing stepwise a charging voltage applied to the battery from the initial charging voltage to the first designated voltage in intervals of a first increment; and
   based on the charging voltage being increased to the first designated voltage, increasing stepwise the charging voltage from the first designated voltage to a second designated voltage in intervals of a second increment,
   wherein the first increment is greater than the second increment, and wherein an amount of the current is gradually decreased by increasing stepwise the charging voltage.

7. The method as claimed in claim 6, further comprising:
   based on the initial charging voltage being greater than the first designated voltage and less than the second designated voltage, increasing stepwise the charging voltage from the initial charging voltage to the second designated voltage in intervals of the second increment.

8. The method as claimed in claim 6, wherein the second designated voltage is a maximum charging voltage.

9. The method as claimed in claim 6, further comprising:
   obtaining at least one battery parameter from the battery, and
   retrieving an SOC of the battery corresponding to the at least one battery parameter in the memory as a current SOC of the battery.

10. The method as claimed in claim 6, wherein a current resulting from the charging voltage does not exceed a maximum possible current value.

11. A device for charging of a battery, the device comprising:
a memory; and
a processor electrically connected to the memory,
wherein the memory comprises instructions executed by the processor,
wherein the instructions configure the processor to:
determine a charging voltage based on a state of charge (SOC) of the battery, retrieve a multistep constant voltage (MSCV) profile that matches the current SOC of the battery, apply a voltage specified by the MSCV profile as an initial charging voltage,
charge the battery based on the initial charging voltage,
wherein, when charging the battery, the processor is further configured to:
based on the charging being less than a first designated voltage, increase the charging voltage by an increment of a first voltage in each of at least one first time period to reach a first designated voltage, and
based on the charging voltage being increased to the first designated voltage, increase the charging voltage from the first designated voltage by an increment of a second voltage in each of at least one second time period to reach a second designated voltage, and
wherein the first voltage is greater than the second voltage, and wherein an amount of the current is gradually decreased by increasing stepwise the charging voltage.

12. A method for charging of a battery, the method comprising:
determining a charging voltage based on a state of charge (SOC) of the battery, retrieving a multistep constant voltage (MSCV) profile that matches the current SOC of the battery, applying a voltage specifed by the MSCV profile as an initial charging voltage,
charging the battery based on the charging voltage,
wherein the charging the battery based on the charging voltage comprises:
based on the initial charging being less than a first designated voltage, increasing the charging voltage by an increment of a first voltage in each of at least one first time period to reach a first designated voltage, and
based on the charging voltage being increased to the first designated voltage, increasing the charging voltage from the first designated voltage by an increment of a second voltage in each of at least one second time period to reach a second designated voltage,
wherein the first voltage is greater than the second voltage, and wherein an amount of the current is gradually decreased by increasing stepwise the charging voltage.

* * * * *

UNITED STATES PATENT AND TRADEMARK OFFICE
CERTIFICATE OF CORRECTION

PATENT NO. : 10,637,268 B2
APPLICATION NO. : 15/154325
DATED : April 28, 2020
INVENTOR(S) : Ashish Khandelwal et al.

Page 1 of 1

It is certified that error appears in the above-identified patent and that said Letters Patent is hereby corrected as shown below:

On the Title Page

1. In Column 1, item (30), Foreign Application Priority Data, add a Line 3:
"October 8, 2015 (IN)...............2470/CHE/2015".

Signed and Sealed this
Second Day of June, 2020

Andrei Iancu
*Director of the United States Patent and Trademark Office*